United States Patent [19]

Piejko et al.

[11] Patent Number: 5,039,747
[45] Date of Patent: Aug. 13, 1991

[54] MIXTURES OF THERMOPLASTIC POLYMERS IN POWDER FORM

[75] Inventors: Karl-Erwin Piejko, Bergisch Gladbach; Christian Lindner; Otto Koch, both of Cologne, Fed. Rep. of Germany

[73] Assignee: Bayer Aktiengesellschaft, Leverkusen, Fed. Rep. of Germany

[21] Appl. No.: 338,939

[22] Filed: Apr. 10, 1989

[30] Foreign Application Priority Data

Apr. 21, 1988 [DE] Fed. Rep. of Germany ....... 3813363

[51] Int. Cl.$^5$ .............................................. C08L 27/12
[52] U.S. Cl. ..................................................... 525/197
[58] Field of Search .......................................... 525/197

[56] References Cited

U.S. PATENT DOCUMENTS 4,522,959 6/1985 Lindner et al. ...................... 525/230
4,522,964 6/1985 Lindner et al. ...................... 525/230
4,668,738 5/1987 Lee et al. ............................. 525/177

FOREIGN PATENT DOCUMENTS 121854 10/1984 European Pat. Off. .
121855 10/1984 European Pat. Off. .

Primary Examiner—Melvyn I. Marquis
Assistant Examiner—W. R. H. Clark
Attorney, Agent, or Firm—Connolly and Hutz

[57] ABSTRACT

A process for the production of mixtures of thermoplastic polymers in powder form from aqueous emulsions of
a) a thermoplastic resin, and
b) a rubber-rich graft polymer in which aqueous emulsions of a) and b) having polymer contents of 15 to 50% by weight are mixed continuously or semicontinuously in separate product streams, but at the same time, with a coagulation solution at a temperature of 50° to 100° C. with coagulation of polymers a) and b), the product streams are combined and the polymer mixture is separated off.

3 Claims, No Drawings

MIXTURES OF THERMOPLASTIC POLYMERS IN POWDER FORM

This invention relates to a process for the production of mixtures of thermoplastic polymers in powder form from aqueous emulsions of the polymers. The process is technically particularly simple and gives powder-form mixtures of reduced dust content, improved free flow and stability in storage, so that subsequent processing is also made much easier.

Mixtures of thermoplastic resins (for example copolymers of vinyl compounds) and graft polymers of vinyl compounds on rubbers and also mixtures of various graft polymers of vinyl compounds on rubbers are technically important thermoplastic molding compositions.

Many of these resins and graft polymers have to be produced in aqueous emulsion and isolated therefrom. To produce molding compositions containing resin and graft polymers, the emulsions of the polymers accumulating may be mixed and the resulting mixture worked up. The polymer mixture thus obtained, generally in powder form, shows advantageous properties for processing.

For powder-form mixtures, the powder properties are of importance. For example, freedom from dust is often required, the particle size distribution has to be adapted to certain requirements and the powders should neither cake nor clump.

The powder properties of the powder mixture may be influenced to a certain extent by specialized step-by-step coagulation ("gradient" coagulation), i.e. by certain consecutive coagulation steps.

According to EP-PS 121 855, GB-PS 1,113,348 and GB-PS 1,568,469, mixtures of soft and hard polymer components in powder form are produced by the formation of a type of coating around the soft, caking-prone polymer components by "delayed" coagulation of the hard polymer. EP-PS 121 854 describes the formation of coarse powder from finely divided, hard polymer by means of soft polymers by "gradient coagulation".

These processes are technically elaborate and can only be carried out in specialized, suitably technically equipped coagulation plants.

It has been found that satisfactory powder-form mixtures can be reproducibly obtained in the co-coagulation of aqueous emulsions of certain polymers without any need for elaborate measuring and control systems providing the emulsions are coagulated at the same time, but separately, and are mixed immediately after coagulation.

Accordingly, the present invention relates to a process for the production of mixtures of thermoplastic polymers in powder form from aqueous emulsions of a) a thermoplastic resin in the form of a homo- or copolymer of styrene, α-methylstyrene, methyl methacrylate or acrylonitrile optionally containing up to 30% by weight of a rubber and b) a rubber-rich graft polymer of styrene, α-methylstyrene, acrylonitrile, methyl methacrylate and/or alkyl acrylate on a diene or alkyl acrylate rubber having a rubber content of 50 to 90% by weight, characterized in that aqueous emulsions of a) and b) having polymer contents of 15 to 50% by weight are mixed continuously or semicontinuously in separate product streams, but at the same time, with a coagulation solution at a temperature of 50° to 100° C. with coagulation of the polymers a) and b), the product streams are combined and the polymer mixture is then separated off.

Mixtures of 50 to 95% by weight and preferably 60 to 85% by weight of component a) and 5 to 50% by weight and preferably 15 to 40% by weight of component b) may advantageously be prepared.

Components a) and b) of the mixture prepared in accordance with the invention are known.

Component a) consists of thermoplastic resins, i.e. homopolymers or copolymers of styrene, α-methylstyrene, methyl methacrylate or acrylonitrile; copolymers of styrene and acrylonitrile, α-methylstyrene and acrylonitrile, styrene, α-methylstyrene and acrylonitrile, methyl methacrylate and styrene, methyl methacrylate and acrylonitrile and also polymethyl methacrylate are particularly suitable. Particularly suitable resins in the context of the invention contain at least 50% by weight styrene or α-methylstyrene. Component a) also includes resins containing a small quantity of rubber in copolymerized form or in admixture. Suitable rubbers are known particulate, partially crosslinked diene rubbers or alkyl acrylate rubbers. The resin-forming monomers may be graft-polymerized onto the rubber or a mixture of rubber and resin may be present.

In either case, the rubber content of component a) should not exceed 30% by weight, rubber contents of up to 10% by weight being preferred.

Component b) of the process according to the invention is a rubber-rich graft polymer of vinyl compounds on a partially crosslinked, particulate rubber having average particle diameters ($d_{50}$) of 0.05 to 1 μm. Graft-polymerized vinyl compounds are styrene, α-methylstyrene, acrylonitrile, methyl methacrylate and alkyl acrylate or mixtures thereof. Particular preference is attributed to methyl methacrylate and mixtures of styrene and acrylonitrile, α-methylstyrene and acrylonitrile, methyl methacrylate and styrene, methyl methacrylate and alkyl acrylate, α-methylstyrene, methyl methacrylate and acrylonitrile. Suitable rubbers for component b) (graft bases) are diene homopolymers and copolymers, for example of butadiene, isoprene, chloroprene, optionally with up to 35% by weight comonomers, such as styrene, acrylonitrile, methyl methacrylate, alkyl acrylate, vinyl methyl ether, or alkyl acrylate polymers (particularly of $C_1$-$C_8$ alkyl acrylates) optionally containing up to 20% by weight vinyl monomers, such as styrene, acrylonitrile, vinyl acetate, $C_1$-$C_8$ alkyl methacrylate, in copolymerized form. In general, the acrylate rubbers are partially crosslinked by copolymerization of polyfunctional vinyl or allyl monomers. Crosslinking monomers are, for example, bisacrylates, bisacrylamides, butadiene, vinyl acrylate, triallylcyanurate, trialkylisocyanurate, citric acid trisallylester, biscarboxylic acid vinyl ester.

The acrylate rubbers contain the crosslinking monomers in quantities of up to at most 5% by weight. The rubbers of component b) may also have a core/shell structure, i.e. the acrylate rubber particles contain a rubber core, which differs structurally from the acrylate rubber surrounding it, or a hard thermoplastic resin core.

Component b) generally contains 50 to 90% by weight rubber and preferably 60 to 85% by weight.

Components a) and b) may be prepared in known manner by emulsion polymerization in aqueous media or emulsion graft polymerization in the presence of rubber latices. In the case of rubber-free polymers a), the monomers are radically polymerized in aqueous medium in the presence of soaps (emulsifiers) at pH values of from about 12 to 2 and more especially from 10 to 3. Suitable initiators are, in particular, water-soluble radical formers, such as peroxodisulfates, peroxodiphosphates, water-soluble hydroperoxides and peroxoacids and also redox initiator systems. The polymerization, which is normally carried out at 40° to 90° C., requires the presence of an ionic emulsifier, more especially an anionic emulsifier, in quantities of up to 4% by weight and preferably in quantities of up to 2% by weight, based on the monomers. Suitable emulsifiers are, for example, fatty acid salts, alkyl sulfonic acid salts containing relatively long-chain alkyl radicals and sulfuric acid alkyl semiesters containing relatively long-chain alkyl radicals.

To produce graft polymers on rubbers, the monomers to be grafted may be polymerized in the presence of an aqueous rubber emulsion similarly to the foregoing description.

Aqueous emulsions a) and b) having polymer solids contents of 15 to 50% by weight and preferably 20 to 40% by weight are used for the process according to the invention. It is particularly favorable to use emulsions of a) and b) having substantially the same polymer solids content, preferably about 30 to 40% by weight, for carrying out the process according to the invention.

The process according to the invention may be carried out as follows:

The latices of components a) and b) are separately introduced with stirring continuously or discontinuously into one or more reactors arranged one behind the other. The reactor contains an aqueous coagulation solution. "Separately introduced" means that the two emulsions are fed into the reactor in such a way that they enter the coagulation solution without being mixed with one another. This may be done by introducing the emulsions at different points of the reactor through separate feed systems. The temperature is preferably in the range from 50° to 100° C. and more preferably in the range from 70° to 95° C. The coagulation solution is an aqueous solution of water-soluble, inorganic or organic acids and/or salts, such as hydrochloric acid, sulfuric acid, phosphoric acid, formic acid, acetic acid, propionic acid, alkali and alkaline earth chlorides, sulfates, formates, acetates, phosphates. Depending on the latex mixture to be coagulated, 0.5 to 15% by weight aqueous solutions are generally used. The coagulation solution, the emulsion of a) and the emulsion of b) must be intensively mixed at the temperature indicated.

Where several reactors arranged one behind the other are used, both emulsions are advantageously introduced into the first reactor. In the other reactors, the polymer slurry in water formed during coagulation may be after-treated at the same temperatures as in the first reactor or even at higher temperatures. The particle structure of the polymer powder and the particle size distribution may be improved by this after-treatment. The process according to the invention requires residence times of 15 minutes to 5 hours and preferably 1 hour to 3 hours.

The polymer slurry initially formed may be separated off in the usual way, for example by filtration or centrifugation, and then washed and dried.

The powder-formed polymer mixtures obtained show an improved particle size distribution which is reflected, for example, in the substantial absence of dust, in free flow and in processability typical of thermoplastics. Since the polymer mixtures are used as additives for known thermoplastics, such as polyvinyl chloride and ABS, to improve their properties, for example notched impact strength and heat resistance, it is crucial that the powder can readily be fed into continuous processing machines for thermoplastics, combines with the melt of the thermoplastic at high temperatures and is uniformly dispersed or dissolved therein. The products according to the invention exhibit these properties.

The fact that the powder-form polymer mixtures according to the invention are substantially free from dust makes them easy to handle.

EXAMPLES

I) Rubber latex as graft base n-butylacrylate rubber latex partially crosslinked with triallylcyanurate; polymer content 37% by weight. Average diameter of the latex particles 0.5 μm ($d_{50}$ value); gel content 90% by weight (as determined in dimethylformamide at 23° C.).

II) Polymer emulsions

II.1) Component a): Preparation of the copolymer emulsion 1715 parts by weight water, 4 parts by weight of the sodium salt of disproportionated abietic acid, 3 parts by weight of 1N sodium hydroxide and 80 parts by weight of the monomer mixture shown below are introduced into a reactor. The polymerization is started at 80° C. by addition of 4 parts potassium peroxodisulfate in 140 parts by weight water. The rest of the monomer mixture and the inflow solution shown below are then introduced simultaneously over a period of 6 hours, followed by stirring for 4 hours at 80° C. to complete the polymerization.

| Monomer mixture: | acrylonitrile | 434 parts by weight |
|---|---|---|
| | α-methylstyrene | 966 parts by weight |
| | tert.-dodecyl-mercaptan | 3.5 parts by weight |
| Inflow solution: | water | 860 parts by weight |
| | Na-salt of disproportionated abietic acid | 20 parts by weight |
| | 1N sodium hydroxide | 18 parts by weight |

A 33% by weight latex of the polymer is obtained.

II.2) Component b): Preparation of the graft polymer emulsion

II.2.1)

5892 parts by weight of the rubber latex according to I) and 96 parts by weight water are introduced into a reactor. A solution of 3.75 parts by weight potassium peroxodisulfate in 135 parts by weight water is added at 70° C. Inflow solutions I and II are then added with stirring over a period of 4 hours:

| Inflow 1: | methyl methacrylate | 439 parts by weight |
|---|---|---|
| | n-butylacrylate | 68 parts by weight |
| Inflow 2: | Water | 714 parts by weight |
| | Na-salt of $C_{14}$—$C_{18}$—alkylsulfonic acid | 8.5 parts by weight |

The mixture is then left for 3 hours to complete the polymerization. A 37% by weight latex graft polymer is obtained.

II.2.2)

4722 parts by weight of the rubber latex according to I) and 865 parts by weight water are introduced into a reactor. A solution of 6 parts by weight potassium peroxodisulfate in 200 parts by weight water is added at 70° C. Inflow solutions I and II are then added with stirring over a period of 5 hours:

| Inflow 1: | styrene | 832 parts by weight |
|---|---|---|
| | acrylonitrile | 323 parts by weight |
| Inflow 2: | water | 1450 parts by weight |
| | Na-salt of $C_{14}$—$C_{18}$ alkylsulfonic acids | 25 parts by weight |

The mixture is then left for 4 hours to complete the polymerization. A 34% by weight latex of the graft polymer is obtained.

III) Coagulation to powder-form polymer mixtures

The following coagulation and isolation tests were carried out with a total of 1000 parts by weight polymer. The coagulating agent is a solution of 5000 parts by weight water, 100 parts by weight magnesium sulfate and 100 parts by weight acetic acid. Coagulation is carried out at 90° C.

III.1) Process according to the invention

The emulsion of polymer a) and the emulsion of polymer b), see Table 1, are introduced with stirring into the coagulating solution heated to 90° C. over a period of 30 minutes through separate inflow systems, followed by stirring for 30 minutes at 90° C.

TABLE 1

| Test | Parts by weight polymer a) in the emulsion | Parts by weight polymer b) in the emulsion |
|---|---|---|
| III.1.1) | 800 (Emulsion II.1) | 200 (Emulsion II.2.1) |
| III.1.2 | 730 (Emulsion II.1) | 270 (Emulsion II.2.2) |

III.2) Comparison with "mixing process"

Test III.1.1 is repeated, except that the emulsions of Table I are mixed with one another before coagulation. The emulsion mixture is introduced into the coagulating solution. The temperature, inflow times, stirring times and quantities are as in test III.1.

III.3) Comparison with "gradient process"

Test III.1.1 is repeated except that emulsions II.1 and II.1.2 are successively introduced into the coagulating solution. Emulsion II.1 is introduced over a period of 30 minutes, followed by stirring for 15 minutes at 90° C. Emulsion II.2.1 is then introduced over a period of 30 minutes at 90° C., followed by heating for 30 minutes at 90° C.

For further working up, the polymer slurries prepared in accordance with III.1), III.2) and III.3) are filtered and washed with water until substantially free from electrolyte. The solid product obtained is dried in a fluidized bed drier at around 75° C. to a residual moisture content of less than 0.8% by weight.

IV) Properties of the powder-form polymer mixtures

IV.1 Dust content

A measure of the dust content is the dimming of a light beam passing through the container which is produced by the swirling of dust in that container. The dust is swirled by the dropping of polymer powder under standardized conditions (i.e. dropping of a certain quantity from a height predetermined by the apparatus). The dimming of the light beam is measured immediately after the powder impinges on the bottom of the container and 30 seconds later. (The test is carried out using 30 g powder in a modified Cassela dust measuring instrument.)

The "dust values" are shown in Table 2:

TABLE 2

| Powder composition | Process | "Dust value" (% dimming of light beam) | |
|---|---|---|---|
| | | after 2 seconds | after 30 seconds |
| III.1.1 | Invention (III.1.1) | 10 | 1 |
| Table 1 | Comparison (III.2) | 37 | 7 |
| | Comparison (III.3) | 36 | 6 |
| III.1.1 | Invention (III.1.2) | 12 | 2 |
| Table 1 | Comparison (III.2) | 30 | 6 |

IV.2 Apparent densities

Table 3 shows the weight of 1 liter of powder-form polymer mixture (apparent density).

TABLE 3

| Powder composition according to | Process | Apparent density [g/l] |
|---|---|---|
| III.1.1 | III.1.1 | 450 |
| Table 1 | III.2 | 330 |
| | III.3 | 380 |

As can be seen from Tables 2 and 3, the dust content of the powder is reduced and its apparent density increased by the process according to the invention.

What is claimed is:

1. A process for the production of mixtures of thermoplastic polymers in powder form from aqueous emulsions of
   a) a thermoplastic resin in the form of a homopolymer or copolymer of styrene, α-methyl styrene, methyl methacrylate or acrylonitrile optionally containing up to 30% by weight of a rubber and
   b) a rubber-rich polymer of styrene, α-methyl styrene, acrylonitrile, methyl methacrylate on a diene or alkyl acrylate rubber having a rubber content of 50 to 90% by weight, characterized in that separate aqueous emulsions of a) and b) having polymer contents of 15 to 50% by weight are separately but continuously or semicontinuously mixed in separate product streams with a coagulation solution at 50° to 100° C. thereby causing separate coagulation of the polymers a) and b), whereupon the product streams are combined and the polymer mixture is then separated off.

2. A process as claimed in claim 1, characterized in that 50 to 95% by weight of component a) and 5 to 50% by weight of component b) are mixed.

3. Mixtures of thermoplastic polymers in powder form obtained by the process claimed in claim 1.

* * * * *